UNITED STATES PATENT OFFICE.

LEWIS L. BOCKES, OF GRUNDY CENTRE, IOWA.

HOG-CHOLERA COMPOUND.

SPECIFICATION forming part of Letters Patent No. 238,022, dated February 22, 1881.

Application filed August 7, 1880. (No specimens.)

*To all whom it may concern:*

Be it known that I, LEWIS L. BOCKES, a citizen of the United States, residing at Grundy Centre, in the county of Grundy and State of Iowa, have invented a new and useful Composition of Matter to be used for the Cure of the Disease of Hogs known as "Hog-Cholera," of which the following is a specification.

My composition consists of the following ingredients, combined in the proportions stated, viz: flowers of sulphur, ten pounds; saltpeter, five pounds; Venetian red, ten pounds; sal-soda, ten pounds; gum-camphor, one pound; anise-seed, (ground,) one and a half pound; chalk, three pounds. These ingredients are to be thoroughly pulverized, and after pulverization are to be thoroughly mixed, while dry, until the whole mass is completely mixed.

In using the above-named composition for the cure of hogs diseased with hog-cholera, the same should be given to the diseased animal internally, in doses of from one to two ounces, in any liquid feed, once per day, on alternate days, until cure is effected.

What I claim, and desire to secure by Letters Patent of the United States, is—

The herein-described composition of matter to be used for the cure of the disease of hogs known as "hog-cholera," consisting of flowers of sulphur, saltpeter, Venetian red, sal-soda, gum-camphor, anise-seed, and chalk, in the proportions specified.

LEWIS L. BOCKES.

Witnesses:
 WILLIAM SMYTH,
 J. MORRIS REA.